United States Patent
Lingafelt et al.

(10) Patent No.: US 8,769,679 B1
(45) Date of Patent: Jul. 1, 2014

(54) TUNING OF DATA LOSS PREVENTION SIGNATURE EFFECTIVENESS

(71) Applicant: International Business Machines Corporation, Armonk, NY (US)

(72) Inventors: Charles Steven Lingafelt, Durham, NC (US); James William Murray, Durham, NC (US); James Thomas Swantek, Canton, GA (US); James Steven Worley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 13/717,249

(22) Filed: Dec. 17, 2012

(51) Int. Cl.
*G06F 11/00* (2006.01)

(52) U.S. Cl.
USPC ............. 726/22; 726/25; 713/176; 713/188

(58) Field of Classification Search
CPC . H04L 63/146; H04L 63/1408; H04L 63/145; H04L 63/1441; H04L 9/3281; H04N 21/8358; H04N 1/32144; H04N 2201/3233; G11B 20/00086
USPC ................................ 726/22, 25; 713/188, 176
See application file for complete search history.

(56) References Cited

U.S. PATENT DOCUMENTS

| | | | |
|---|---|---|---|
| 5,452,442 A * | 9/1995 | Kephart | 714/38.1 |
| 5,497,423 A * | 3/1996 | Miyaji | 380/30 |
| 7,450,005 B2 * | 11/2008 | Anand et al. | 340/541 |
| 7,540,025 B2 * | 5/2009 | Tzadikario | 726/22 |
| 7,792,775 B2 * | 9/2010 | Matsuda | 706/47 |
| 8,195,689 B2 * | 6/2012 | Ramanathan et al. | 707/769 |
| 8,356,354 B2 * | 1/2013 | Nazarov | 726/25 |
| 2004/0181664 A1 | 9/2004 | Hoefelmeyer et al. | |
| 2004/0230546 A1 | 11/2004 | Rogers | |
| 2009/0158430 A1 | 6/2009 | Borders | |
| 2010/0100468 A1 | 4/2010 | Spector et al. | |
| 2010/0161830 A1 | 6/2010 | Noy et al. | |
| 2010/0162347 A1 | 6/2010 | Barile | |
| 2010/0254615 A1 | 10/2010 | Kantor et al. | |
| 2010/0274691 A1 | 10/2010 | Hammad et al. | |
| 2011/0155801 A1 | 6/2011 | Rowberry | |
| 2011/0225650 A1 | 9/2011 | Margolies et al. | |

OTHER PUBLICATIONS

Method and System for Grouping, Activating and Deactivating Rules in a Complex Event Processing System, IP.com, Feb. 17, 2006, http://ip.com/IPCOM/000133926.

Dynamic Generation of Rules from Properties to Improve Rule Processing Performance, IP.com, Jan. 1, 2000, http://ip.com/IPCOM/000014005.

Graphical Notation for Assignment of Rule Sets in a Distributed Rule Base, IP.com, Mar. 31, 2004, http://ip.com/IPCOM/000023770.

* cited by examiner

*Primary Examiner* — Amare F Tabor
(74) *Attorney, Agent, or Firm* — Cahn & Samuels, LLP; Louis J. Percello, Esq.

(57) ABSTRACT

In at least one embodiment, a method and a system include capability to fine-tune a data loss prevention system. An example method includes gaining access to or creating an alert database and a signature set by an analytics module and an adjustment module, where the alert database includes an alert validity attribute for each alert; quantifying for each signature contained in the signature set an effect on the change in the number of alerts from its removal; determining with an analytics module whether any signature has a ratio of valid to false positive alerts less than a threshold; and when at least one signature has the ratio less than the first threshold identifying and removing with an adjustment module at least one signature from the signature database having a ratio less than the threshold where the signature is removed from the signature set, and repeating quantifying and determining.

21 Claims, 8 Drawing Sheets

| Rule ID | Copy of Packet | Alert Metadata | Alert_validity_attribute |
|---|---|---|---|
| 1 | A | | Valid |
| 3 | A | | Valid |
| 5 | B | | Valid |
| 3 | C | | False Positive |
| 7 | C | | False Positive |
| 11 | D | | False Positive |

FIG. 2A

| | drop_rule_attribute | | |
|---|---|---|---|
| Rule ID | Number of alerts uniquely found by rule (alerts not selected by not applying removed rule) | Number of false positive alerts (when rule applied against unique alerts) | Number of valid alerts (when rule applied against unique alerts) |
| 3 | 0 | 0 | 0 |
| 12 | 10 | 10 | 0 |
| 44 | 12 | 11 | 1 |
| 19 | 15 | 10 | 5 |

FIG. 2B

TUNING OF DATA LOSS PREVENTION SIGNATURE EFFECTIVENESS

BACKGROUND

The present invention relates to tuning Data Loss Prevention (DLP) signatures to improve effectiveness of the DLP sensor using the signatures. In more specific embodiments, quantification iterations are used to fine tune a set of signatures for use by the DLP sensor.

DLP systems typically examine packet and message flows within a network link. These links are typically at key points in the network, e.g., at the egress between the intranet and the internet. DLP rules describe what the systems will look for in the flows. Today, these DLP systems generate an enormous number of false positive alerts, and the tuning or alteration of the signatures is done manually with the effectiveness of the tuning is dependent on the particular skills of the tuner.

In some instances, there are hundreds or more rules, with various levels of complexity. For example a rule which produces an alert if the packet contains "this_character_string" or "this_other_charater sting" or "this_other_charater_srting_with_wild_card_characters" or "any_strings_with_structure_of_a_national_ID_number_for_set_of_countries" and not from this set of internet protocol (IP) address and the protocol is FTP or SMTP and the destination is from this set of IP ranges.

Because the rules are extremely flexible and numerous, multiple different rules could each detect a true alert for the given set of data examined, and these same different rules could produce different amounts of false positive alerts. Thus, one job of the tuner is to identify those rules from a set that will most often correctly yield a true alert, but minimize the false positives, then remove the other rules that produce greater false positive alerts.

SUMMARY OF THE INVENTION

The invention in at least one embodiment includes a method including: processing a flow of packets with a data loss prevention sensor using a signature set; diverting any packet that matches at least one signature to an alert database; receiving an alert validity attribute into the alert database; quantifying for each signature contained in the signature set an effect on the change in the number of alerts from its removal; determining with an analytics module whether any signature has a ratio of valid to false positive alerts less than a first threshold; and when at least one signature has the ratio less than the threshold identifying and removing with an adjustment module at least one signature having a ratio less than the first threshold where the signature is removed from the signature set, and repeating quantifying and determining. In a further embodiment, when no signature has the ratio less than the first threshold, repeating the method. In a further embodiment, the method further includes receiving into the analytics module the first threshold. In a further embodiment, the method further includes receiving in the alerts database historical alerts including an identification of the signature that caused the alert, a copy of the packet associated with the alert, and an alert metadata. In at least one embodiment, quantifying includes for each signature having the ratio less than a second threshold: removing from the signature set that signature, applying the modified signature set against the packets present in the alerts database, and determining at least one attribute for the signature. In a further embodiment to the prior embodiment, the at least one attribute includes at least one of a total number of alerts not selected by not applying the removed rule, a number of associated valid alerts, and a number of associated false positive alerts. In a further embodiment to either of the previous embodiments, identifying and removing includes ordering the signatures by at least one attribute from smallest to largest with the analytics module, displaying through the adjustment module at least one signature and its associated at least one attribute to a user, and removing with the adjustment module at least one signature from the signature set in response to a removal instruction from the user or ordering the signatures based on at least one attribute from smallest to largest with the analytics module, and removing with the adjustment module the first signature from the signature set. In at least one embodiment, the method further includes: annotating at least one signature in the signature set with a signature weighting; including in the metadata for any alert the signature's signature weighting; and removing from quantifying any signature having its signature weighting above a value threshold. In at least one embodiment, the method further including: annotating at least one signature in the signature set with a signature weighting; including in the metadata for any alert the signature's signature weighting; and for each signature after it has been quantified, modifying its ratio by its signature weighting. In at least one embodiment, the alert validity attribute into the alert database includes generating with a positive analyzer an alert validity attribute for each alert in the alert database. In at least one embodiment, receiving the alert validity attribute into the alert database includes displaying with a positive analyzer each alert to a user for review and categorization of the alert as valid or false positive, receiving with the positive analyzer each categorization, and updating the alert validity attribute for the respective alert in the alert database that the positive analyzer received the categorization for.

The invention in at least one embodiment includes a method including: gaining access to an alert database and a signature set by an analytics module and an adjustment module, where the alert database includes whether each alert is a valid alert or a false positive alert; quantifying for each signature contained in the signature set an effect on the change in the number of alerts from its removal; determining with an analytics module whether any signature has a ratio of valid to false positive alerts less than a first threshold; and when at least one signature has the ratio less than the first threshold identifying and removing with an adjustment module at least one signature from the signature database having a ratio less than the first threshold where the signature is removed from the signature set, and repeating quantifying and determining.

The invention in at least one embodiment includes a method including: creating an alert database having a plurality of alerts each alert resulting from a determination by a data loss prevention sensor that a packet matches at least one signature in a signature set and each alert having an associated alert validity attribute; quantifying for each signature contained in the signature set an effect on the change in the number of alerts from its removal by removing from the signature set that signature, applying the modified signature set against the packets present in the alerts database, and determining at least one attribute for the signature; determining with an analytics module whether any signature has a ratio of valid to false positive alerts less than a threshold; when at least one signature has the ratio less than the threshold identifying and removing with an adjustment module at least one signature having a ratio less than the threshold where the signature is removed from the signature set, and repeating quantifying and determining; and when no signature has the ratio less than the threshold, repeat the method.

The invention in at least one embodiment includes a method including: creating an alert database having a plurality of alerts each alert resulting from a determination by a data loss prevention sensor that a packet matches at least one signature in a signature set and each alert having an associated alert validity attribute; quantifying for each signature contained in the signature set an effect on the change in the number of alerts from its removal by removing from the signature set that signature, applying the modified signature set against the packets present in the alerts database, and determining at least one attribute for the signature, where the at least one attribute includes a total number of unique alerts representing alerts not selected by not applying the removed rule, a number of associated unique valid alerts, and a number of associated unique false positive alerts; determining with an analytics module whether any signature has a ratio of unique valid to unique false positive alerts less than a unique threshold; when at least one signature has the unique ratio less than the unique threshold identifying and removing with an adjustment module at least the first signature in an ordered list of signatures based on the unique ratios of the signatures, where the first signature is removed from the signature set, and repeating quantifying and determining; and when no signature has the ratio less than the threshold, repeat the method.

The invention in at least one embodiment includes a system including: a computer readable storage medium for storing at least one alert database and at least one associated signature set to each alert database; an analytics module in communication to the computer readable storage medium, the analytics module analyzes at least one alert database present on the computer storage medium to determine whether any signatures from the signature set associated with the alert database being analyzed are ineffective based at least on a ratio of valid alerts to false positive alerts for individual signatures selected from a group including a plurality of signatures present in the signature set; and an adjustment module in communication to the computer readable storage medium and the analytics module, the adjustment module removes at least one ineffective signature from the signature set.

The invention in at least one embodiment includes a system including: a data loss prevention sensor having a signature set containing a plurality of signatures each capable of causing an alert for any data packet passing through the data loss prevention sensor; a computer readable storage medium for storing an alert database in communication with the data loss prevention sensor; an analytics module in communication to the computer readable storage medium, the analytics module analyzes at least one alert database present on the computer storage medium to determine whether any signatures from the signature set associated with the alert database being analyzed are ineffective based at least on a ratio of valid alerts to false positive alerts for individual signatures selected from a group including a plurality of signatures present in the signature set; and an adjustment module in communication to the computer readable storage medium and the analytics module, the adjustment module removes at least one ineffective signature from the signature set.

In a further embodiment to the above system embodiments, the analytics module determines whether one signature is ineffective by quantifying each signature having the ratio less than a quantification threshold by removing iteratively from the signature set each signature having the ratio less than the quantification threshold, applying the modified signature set against the packets present in the alerts database, and determining at least one attribute for the removed signature. In a further embodiment to any of the above system embodiments, the at least one attribute includes at least one of a total number of alerts not selected by not applying the removed signature, a number of associated valid alerts, and a number of associated false positive alerts. In a further embodiment to any of the above system embodiments, the analytics module identifies at least one signature to be removed by ordering the signatures based on at least one attribute from smallest to largest with the analytics module. In a further embodiment to any of the above system embodiments, the analytics module orders the signatures by at least one attribute from smallest to largest with the analytics module, and the adjustment module removes at least one ineffective signature by displaying through the adjustment module at least one signature and its associated at least one attribute to a user, and removing with the adjustment module at least one signature from the signature set in response to a removal instruction from the user. In a further embodiment to any of the previous system embodiments, the analytics module eliminates from consideration any signature having its signature weighting above a value threshold or the analytics module factors into the determination of the ratio of valid to false positive alerts a signature weighting.

The invention according to at least one embodiment includes a computer program product for fine tuning a signature set for a data loss protection system, the computer program product including a computer readable storage medium having stored thereon: first program instructions executable by a processor to cause the processor to quantify each signature contained in the signature set an effect on the change in the number of alerts from its removal; second program instructions executable by a processor to cause the processor to determine with an analytics module whether any signature has a ratio of valid to false positive alerts less than a first threshold; and third program instructions executable by a processor to cause the processor to identify and removing with an adjustment module at least one signature from the signature database having a ratio less than the first threshold where the signature is removed from the signature set when at least one signature has the ratio less than the first threshold, and fourth program instructions executable by a processor to cause the processor to perform each of the program instructions at least once when at least one signature has the ratio less than the first threshold. In at least one further embodiment, quantifying includes for each signature having the ratio less than a second threshold: removing from the signature set that signature, applying the modified signature set against the packets present in the alerts database, and determining at least one attribute for the signature. In a further embodiment, the at least one attribute includes at least one of a total number of alerts not selected by not applying the removed signature, a number of associated valid alerts, and a number of associated false positive alerts; and the first threshold equals the second threshold.

The invention in at least one embodiment includes a computer program product for fine tuning a signature set for a data loss protection system, the computer program product including a computer readable storage medium having stored thereon: first program instructions executable by a processor to cause the processor to receive an alert validity attribute for a plurality of alerts in an alert database from a user; second program instructions executable by a processor to cause the processor to quantify each signature contained in the signature set having a ratio of valid to false positive alerts less than a quantification threshold, where quantifying for each signature an effect on the change in the number of alerts from its removal; third program instructions executable by a processor to cause the processor to determine with an analytics module whether any signature has a ratio of valid to false positive alerts less than a remove threshold; and fourth program instructions executable by a processor to cause the processor to identify and remove with an adjustment module the first signature present on a reordered list of signatures determined by the third program instructions based on at least one attribute quantified by the second program instructions, and fifth program instructions executable by a processor to cause the processor to perform each of the program instructions at least once when at least one signature has the ratio less than the remove threshold.

BRIEF DESCRIPTION OF DRAWINGS

The present invention is described with reference to the accompanying drawings. In the drawings, like reference numbers indicate identical or functionally similar elements.

FIGS. 2A and 2B illustrate an example of contents of an alert database.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

The invention in at least one embodiment includes a method and system for analyzing the efficiency of rules present in a Data Loss Prevention (DLP) system using the stored valid and false positive alerts in addition to the full packet associated with each of the alerts. In a further embodiment, the analysis includes the running of "what-if" simulations on the valid and false positive alerts.

Figure 1A:
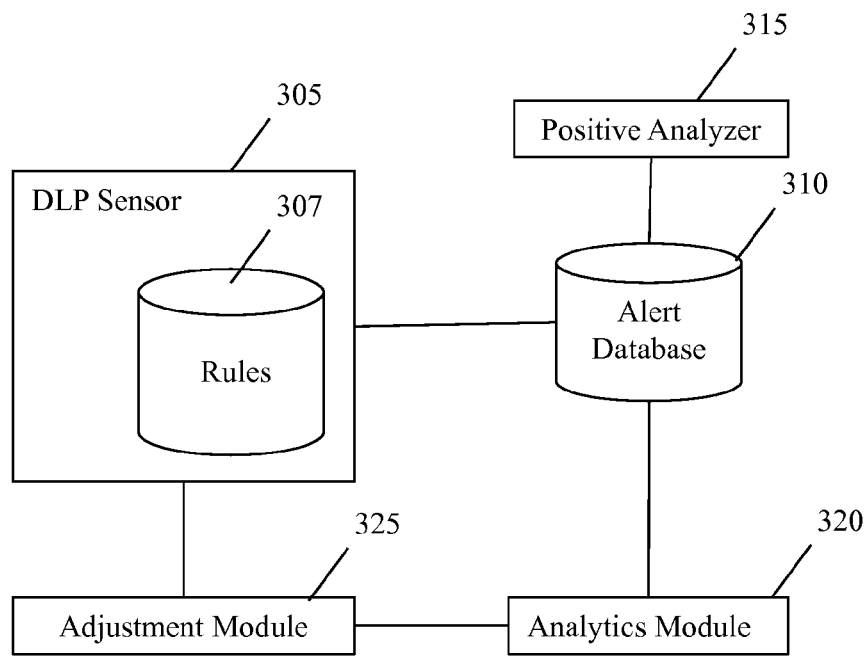
FIGS. 1A and 1B illustrate block diagrams according to at least one embodiment of the invention.
Figure 1B:
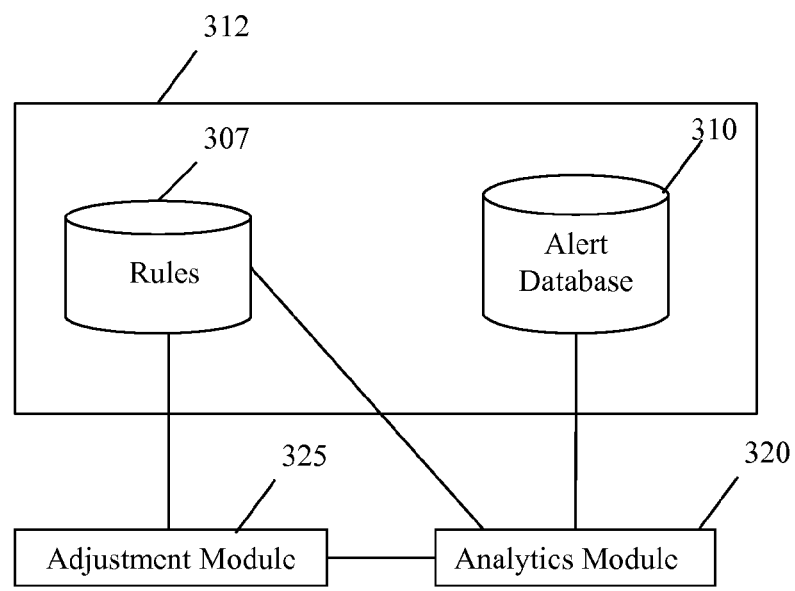

FIG. 1A illustrates a block diagram of a DLP system built according to at least one embodiment of the invention. The illustrated system includes a DLP sensor 305 having a rules database 307 containing in at least one embodiment a rule set (or signature set), an alert database 310 in communication with the DLP sensor 305, a positive analyzer 335 in communication with the alert database 310, an analytics module 320 in communication with the alert database 310, and an adjustment module 325 in communication with the analytics module 320 and the rules database 307. In an alternative embodiment, the DLP sensor 305 is omitted while the rules database 307 and the alert database 310 are stored in a computer readable storage medium 312 in communication with the analytics module 320 and the adjustment module 325 as illustrated in FIG. 1B.

The DLP sensor 305 examines the data traffic flow that passes through it using the rules (or signatures) contained in the rules database 307. Examples of data traffic flow include but are not limited to data traffic flow from a local area network to/from the Internet, data traffic flow from a local area network for a department to/from a larger network such as a corporate network or other Intranet, and through a particular point on the network. The DLP sensor 305 generates a set of alerts over time where in at least one embodiment each alert includes identification of the rule that prompted the alert, a copy of the packet and associated metadata for the packet and/or the alert. FIG. 2A illustrates an example of contents of an alert database 310 without inclusion of the alert metadata. The illustrated example of FIG. 2A will be used in the following disclosure to describe the operation of the various systems and methods.

The alert database 310 includes a determination field (or alert validity attribute) for each alert that is received. In at least one embodiment, the alert database 310 is resident in a storage device or on a computer readable medium. In at least one embodiment the determination field is populated by the positive analyzer 335 that determines whether the produced alert is valid or false positive. In an alternative embodiment, the positive analyzer 335 is a user interface for displaying each alert to a user for review and categorization of the alert as valid or false positive, receiving the determination for one or more alerts from the user, and updating the alert database with the received determination. The determination under either embodiment in this paragraph may be performed at predetermined time intervals, upon receipt of an alert, and/or after notification is sent to the positive analyzer 335 (or assigned user that makes the determination) by the alert database 310 of receipt of an alert from the DLP sensor 305.

In at least one embodiment, the analytics module 320 and the adjustment module 325 are located on one or more computing devices that are in communication with the alert database 310 and/or the rules database 307. The analytics module 320 performs analysis of alerts in the alert database 310 at predetermined time intervals or upon receipt of a notification sent by the alert database 310 where the notification results from at least one alert receiving a determination or the number of alerts that receive a determination is over an alert threshold that is predetermined.

In at least one embodiment, the analytics module 320 produces a least effective to most effective rule list for the rules present in an analyzed group of rules. In at least one embodiment, the analytics module 320 ranks the effectiveness of each rule in producing alerts in the alert database by using the data present in the alert database, removing each rule in turn from the rule set contained in the rules database 307, simulating the use of the revised rule set, and determining the effectiveness of each rule. In at least one alternative embodiment, the rule set is selected from the following: all rules that produced at least one alert in the alert database with a determination, all rules that produced at least a predetermined number of alerts in the alert database with a determination, all rules resulting in an alert with a determination over the a predetermined sampling time period, all rules that produced an alert with a determination present in a predetermined sampling number of alerts, or some combination of these. The predetermined number of alerts, the predetermined sampling time period, and the predetermined sampling number of alerts are rule selection thresholds that in at least one embodiment are preset and possibly adjusted to improve operation of the illustrated system.

An example of how a rule could be removed because it is less effective is illustrated in FIG. 2A. Rules 1 and 3 both produced a valid alert for packet A, but rule 3 also produced a false positive alert for packet C. If rule 3 was removed from the rules database, then there would be no decrease in valid alerts (i.e., packet A) while decreasing the number of false positive alerts in the system. A goal of the system and/or user may be to reduce the amount of false positive alerts, even if this also results in the removal of valid alerts. For example, if a typical rule produced 10 false positives for each valid alert, and the rule under investigation produced 10,000 false positives for each valid alert, the analysis may choose to remove the signature under investigation from the system and forego the 1 valid alert in exchange for a reduction of 10,000 false positives from the system.

In at least one embodiment, the adjustment module 325 removes rules determined by the analytics module 320 that have a low effectiveness from the rules database 307. In an alternative embodiment, the adjustment module 325 includes an interface to display the least effective to most effective rule list to a user where an example of information that could be displayed is illustrated in FIG. 2B, receive selections from the user as to which rule(s) to remove, and removes the rules from the rules database 107 that correspond to the received selections.

Figure 3:
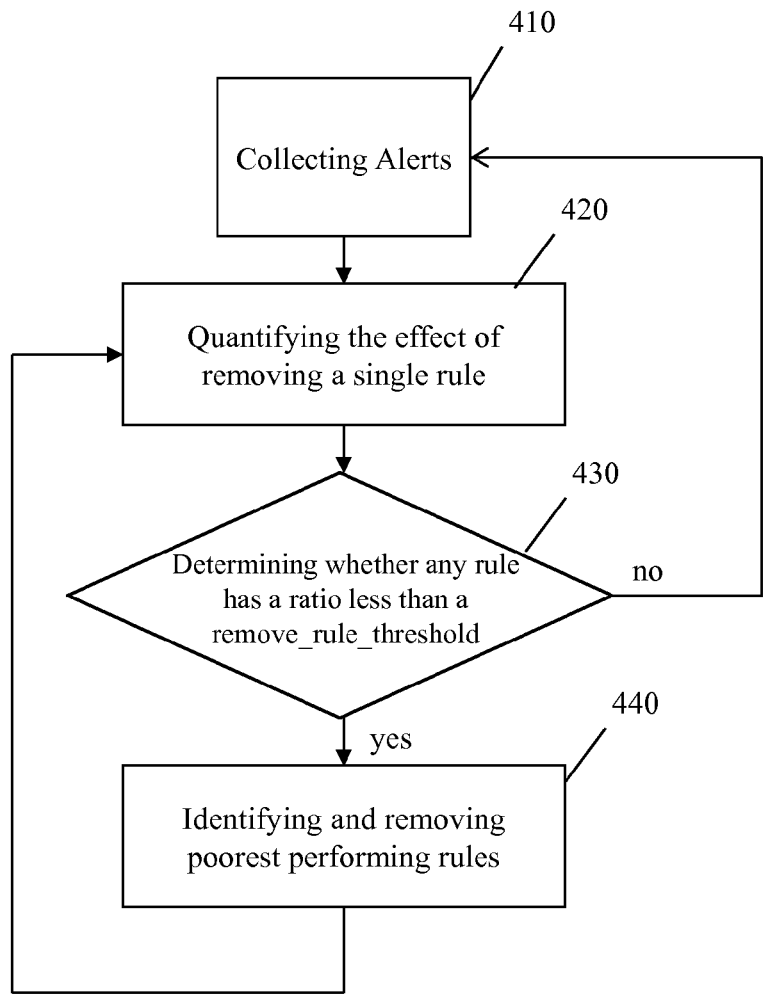
FIG. 3 illustrates a method according to at least one embodiment of the invention.

FIG. 3 illustrates a method according to at least one embodiment of the invention that includes further sub-methods. In at least one embodiment according to the invention, the user that interacts with the system is an administrator. As illustrated in FIG. 3, the method includes collecting alerts produced by a DLP sensor 305 in an alert database 310, 410; quantifying the effect of removing individual rules from the rule set with an analytics module 320, 420; determining with the analytics module 320 whether any rule has a ratio of valid to false positive alerts below a remove_rule_threshold, 440; and identifying with the analytics module 320 (or an adjustment module 325) and removing with the adjustment module 325 at least one of the least effective performing rules, 440; and repeating the quantifying and determining steps. To facilitate the discussion of the methods, the following variables are defined:

Rule—the signature use to describe the packet characteristics, which, if found in a packet, would be viewed as an alert, with the packet and associated metadata copied into an alert database for subsequent analysis.

Alert—the indication that a packet matched a rule. Alerts may be valid or false positive.

Rule_impact_value_weighting—an administrator defined weighting representing the value of the rule to the organization. A high value indicates the rule is important, even if the number and/or ratio of false positives associated to the rule is high, and the importance to the organization of observing even a few valid alerts more than offsets the impact of observing many false positive alerts.

Remove_rule_threshold—the minimum ratio of valid to false positives alerts that is predetermined by the administrator desired for rules within this system. In at least one embodiment, the threshold is different for quantification and removal of rules. In an alternative embodiment, the thresholds are equal to each other.

Master_rule_set—signature set used by the DLP sensor 305 and stored in the rules database 307.

Alert_validity_attribute—indicated if alert is a false positive or valid alert.

Rule_effectiveness—describes the rules as being effective in terms of at least one of the following attributes: number of valid alerts associated to the rule, number of false positive alerts associated to the rule, ratio of valid to false positive alerts.

In at least one embodiment according to the invention, the remove_rule_threshold(s) is set in advance of performing the method or adjusted as part of the preparation of the alert database.

Figure 4:
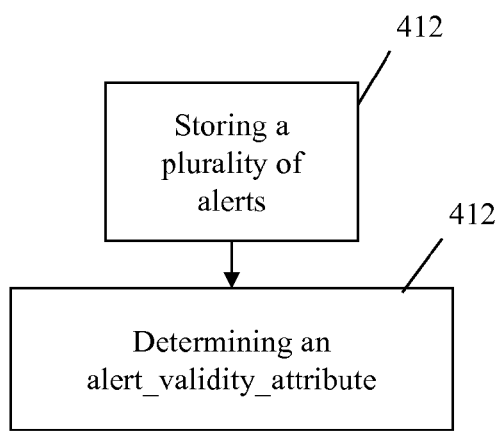
FIG. 4 illustrates a method according to at least one embodiment of the invention.

FIG. 4 illustrates an example of the method performed by collecting alerts, 410. In at least one embodiment, collecting alerts 410 includes storing a plurality of alerts, 412, in the alert database 310 produced by the DLP sensor 305 using the master_rule_set stored in the rules database 307. In at least one embodiment, the alert record includes the rule identification, a copy of the packet, and an alert metadata provided by the DLP sensor 305. The positive analyzer assesses each alert to determine an alert_validity_attribute indicating whether the alert is a valid alert or a false positive alert, 414. In a further embodiment, the analytics module 320 determines the rule effectiveness for each rule by determining the number of valid alerts, the number of false positive alerts, and the ratio of valid to false positive alerts.

In an alternative embodiment, collecting alerts 410 includes storing historical alerts in the alert database 310.

In a further alternative embodiment, collecting alerts 410 is replaced by gaining access to an alert database and a rules database for processing by the analytics module and the adjustment module. In a further alternative embodiment, gaining access includes receiving the alert database and the rules database into a computer readable storage medium (or memory or other storage) in communication with the analytics module and the adjustment module. In this alternative embodiment, the method will have the adjustment module interact with the rules database where the rules database resides. In at least one embodiment, the adjustment module will provide to the source of the databases a last modified rule set produced by the adjustment module 325 and/or a report or a database identifying the rules that were removed from the rules database and at least one attribute that led to the rule being removed.

Figure 5:
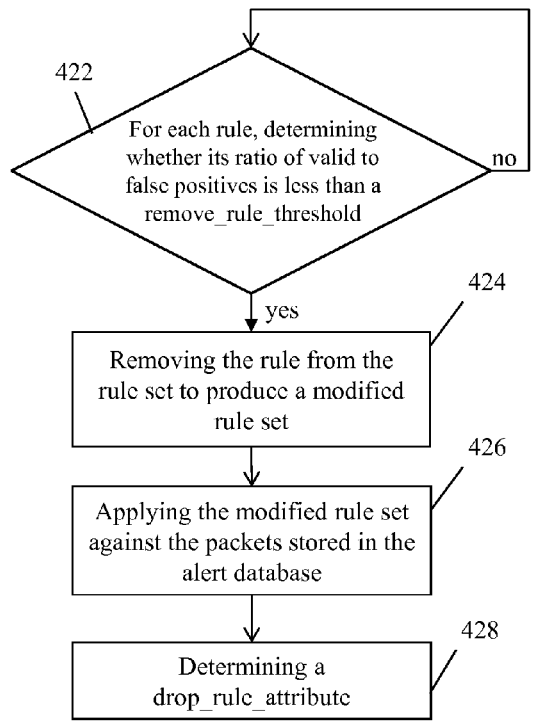
FIG. 5 illustrates a method according to at least one embodiment of the invention.

After the alerts are collected, each rule is quantified by the effect of its removal, 420. FIG. 5 illustrates an example of a method performed by quantifying rules, 420, performed by the analytics module 320. Comparing each rule's ratio of valid to false positive alerts against a remove_rule_threshold (or quantification threshold or second threshold), 422. When the ratio is less than the threshold, removing the rule from the master rule set to produce a modified rule set, 424. Applying the modified rule set against the packets contained in the alerts, 426, stored in the alert database 310. For each alert in the stored alerts that is not selected as a result of not applying the removed rule, determining a drop_rule_attribute containing at least one of the total number of alerts not selected by not applying the removed rule and the associated unique alert validity attribute (either a valid alert or a false positive alert), 428.

Figure 6:
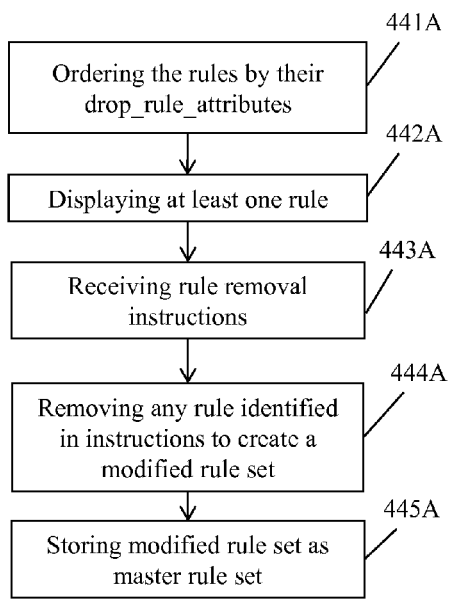
FIG. 6 illustrates a method according to at least one embodiment of the invention.
Figure 7:
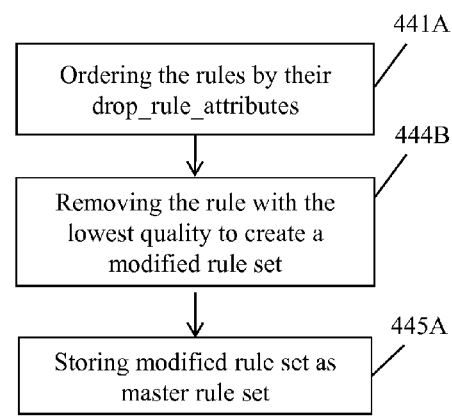
FIG. 7 illustrates an alternative method according to at least one embodiment of the invention.

After the rules have been quantified, the analytics module 320 determines whether no rule has a valid to false positive alerts ratio less than the remove_rule_threshold, 440. In an alternative embodiment, the ratio is taken of the unique valid to unique false positive alerts and/or compared to a unique remove_rule_threshold (or first threshold). When there are no rules having a ratio less than the remove_rule_threshold, the method ends or alternatively alerts are continued to be collected. When there is at least one rule having a ratio less than the remove_rule_threshold, then at least one of the lowest quality rules are identified and removed, 440. FIGS. 6 and 7 illustrate two examples of methods for identifying and removal performed by the analytics module 320 and the adjustment module 325. In at least one embodiment, the first threshold and the second threshold are equal to each other.

FIG. 6 illustrates an identifying and removal method that begins with ordering the rules by their drop_rule_attributes from smallest to largest, 441A. FIG. 2B illustrates an example of ordered rules by their drop_rule_attributes. In at least one embodiment, the rules are ordered based on the ratio of unique valid to unique false positive alerts for that rule although in an alternative embodiment the ordering may occur based on the ratio of valid to false positive alerts for that rule. In an alternative embodiment, the ordering is a ratio of unique valid alerts to unique total alerts for that rule. In a further alternative embodiment, the ordering is based on the number for a respective attribute such as valid unique alerts. Any of the ordering embodiments can be used in combination as tie breakers. Displaying through the adjustment module at least one rule and its associated drop_rule_attribute and validity attributes to a user, 442A. Receiving rule removal instructions if any, 443A, from the user through the adjustment module 325. Removing with the adjustment module 325 any rule identified by the user from the rule set stored in the rules database 307 to create a modified rule set, 444A. Storing the modified rule set as the master rule set in the rule database 307, 445A. In an alternative embodiment, the adjustment module 325 removes the rule by deleting it in the rule set stored in the rules database 307. Requantifying the new master rule set to produce new drop_rule_attributes, 420.

FIG. 7 illustrates an identifying and removal method that begins with ordering the rules by their drop_rule_attributes from smallest to largest, 441A. FIG. 2B illustrates an example of ordered rules by their drop_rule_attributes. The adjustment module 325 removes the rule with the smallest uniquely found alerts from the master rule set stored in the rules database 307 to create a modified rule set, 444B. In an alternative embodiment, the rule having the lowest ratio of valid to false positive alerts is removed. In a further embodiment, the ordering embodiments of the prior paragraph are used. The adjustment module sets the modified rule set as the master rule set in the rules database 307, 445A. In an alternative embodiment, the adjustment module 325 removes the rule by deleting it in the rule set stored in the rules database 307. Requantifying the rule set to produce new drop_rule_attributes, 420.

In an alternative embodiment, the method further includes identifying as part of the metadata for an alert the rule_impact_value_weighting of the rule that caused the alert. The rule_impact_value_weighting is set in at least one embodiment for a plurality of individual rules (although in an alternative embodiment not all rules are required to have a weighting) by a user. Any rule that has been set with a rule_impact_value_weighting above a certain threshold (or value threshold) is omitted from the quantification process and as such is not subject to removal from the master rule set. In an alternative embodiment, the rule is considered during the quantification process, and the resulting ratio of valid to false positives is modified by the weighting, for example, by multiplying the resulting ratio by the weighting.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment or an embodiment combining software (including firmware, resident software, micro-code, etc.) and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
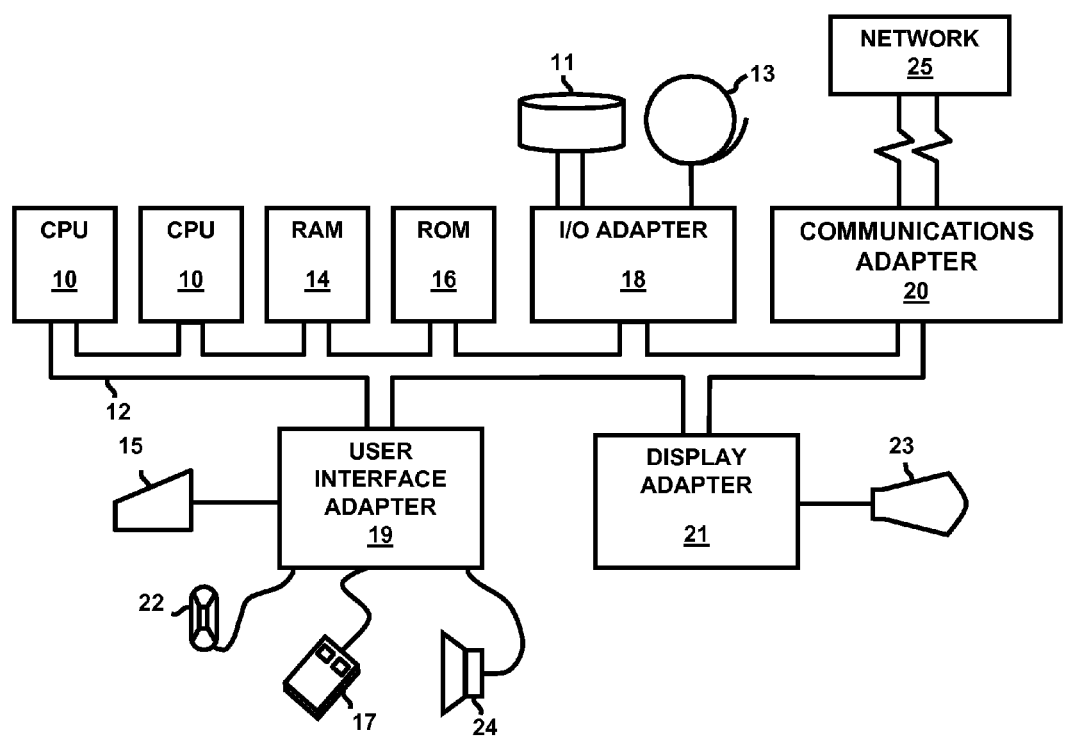
FIG. 8 illustrates a computer program product according to an embodiment of the invention.

Referring now to FIG. 8, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

While it is understood that the process software for tuning DLP rules may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server and then it will be stored on the proxy server.

Figure 9:
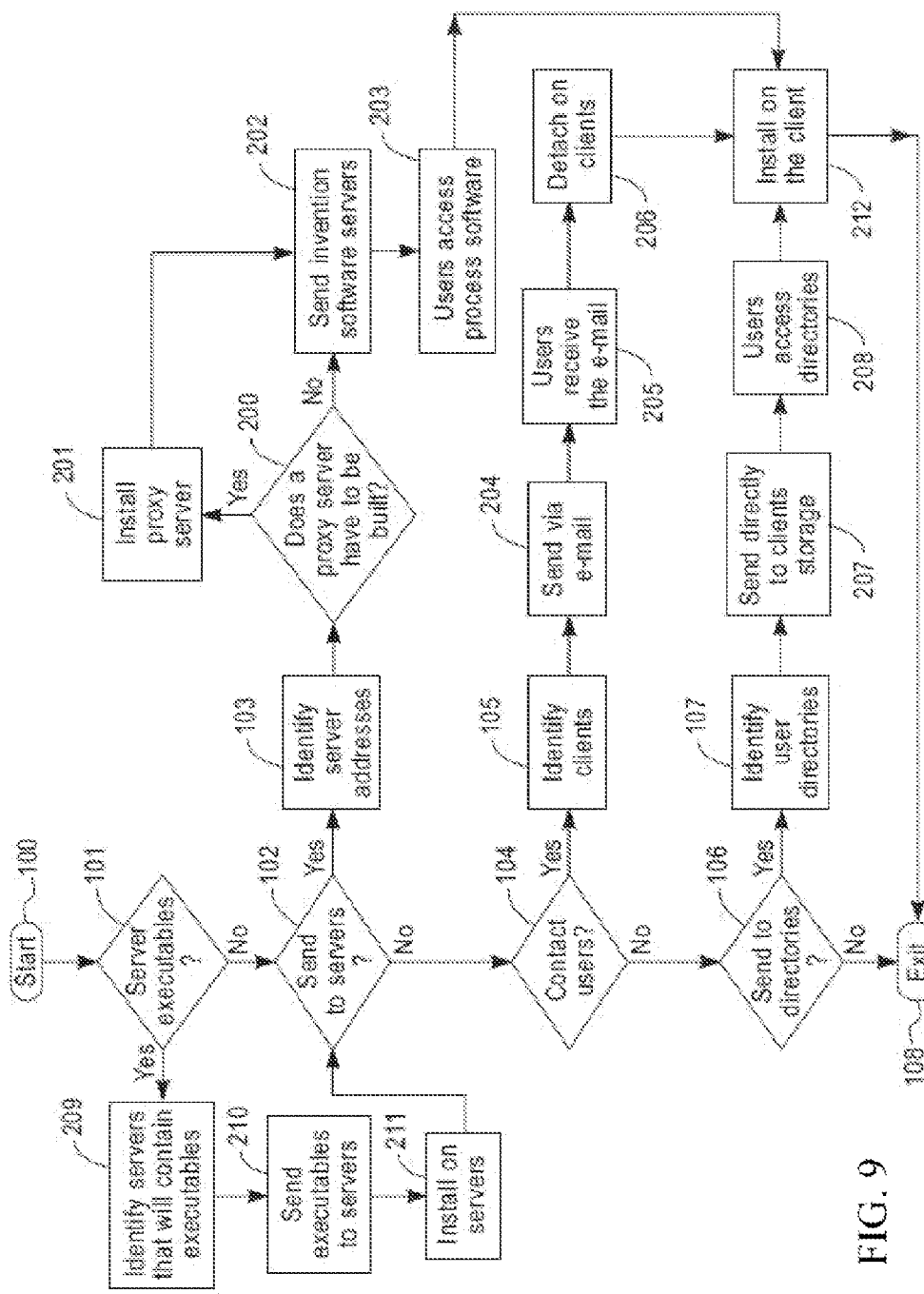
FIG. 9 illustrates an example method for deployment of at least one embodiment according to the invention.

FIG. 9 illustrates a method for the deployment of the process software, 100. The first thing is to determine if there are any programs that will reside on a server or servers when the process software is executed, 101. If this is the case then the servers that will contain the executables are identified, 209. The process software for the server or servers is transferred directly to the servers' storage via FTP or some other protocol or by copying though the use of a shared file system, 210. The process software is then installed on the servers, 211.

Next, a determination is made on whether the process software is be deployed by having users access the process software on a server or servers, 102. If the users are to access the process software on servers then the server addresses that will store the process software are identified, 103.

A determination is made if a proxy server is to be built, 200, to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed, 201. The process software is sent to the servers either via a protocol such as FTP or it is copied directly from the source files to the server files via file sharing, 202. Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems, 203. Another embodiment is to have the servers automatically copy the process software to each client and then run the installation program for the process software at each client computer. The user executes the program that installs the process software on his client computer, 212, then exits the process, 108.

A determination is made whether the process software is to be deployed by sending the process software to users via e-mail, 104. The set of users where the process software will be deployed are identified together with the addresses of the user client computers, 105. The process software is sent via email to each of the users' client computers. The users then receive the e-mail, 205, and then detach the process software from the e-mail to a directory on their client computers, 206. The user executes the program that installs the process software on his client computer, 212, then exits the process, 108.

Lastly a determination is made on whether to the process software will be sent directly to user directories on their client computers, 106. If so, the user directories are identified, 107. The process software is transferred directly to the user's client computer directory, 207. This can be done in several ways such as but not limited to sharing of the file system directories and then copying from the sender's file system to the recipient user's file system or alternatively using a transfer protocol such as File Transfer Protocol (FTP).

The users access the directories on their client file systems in preparation for installing the process software, 208. The user executes the program that installs the process software on his client computer, 212, then exits the process, 108.

The process software with a method for tuning DLP rules is integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 10:
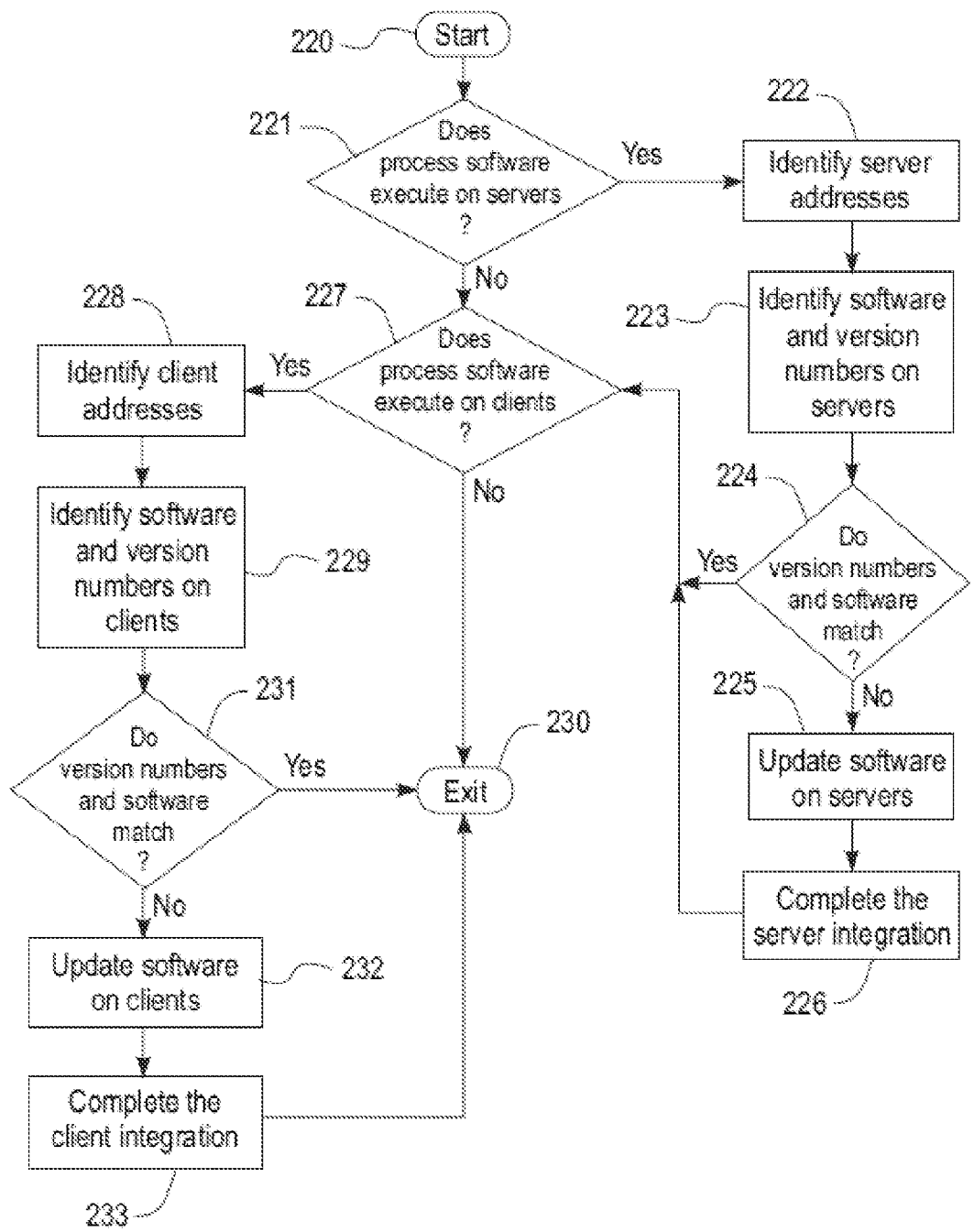
FIG. 10 illustrates an example method for integration of at least one embodiment according to the invention.

FIG. 10 illustrates a method for the integration of the process software, 220. The first thing is to determine if there are any process software programs that will execute on a server or servers, 221. If this is not the case, then integration proceeds to 227. If this is the case, then the server addresses are identified, 222. The servers are checked to see if they contain software that includes the operating system (OS), applications, and network operating systems (NOS), together with their version numbers that have been tested with the process software, 223. The servers are also checked to determine if there is any missing software that is required by the process software, 223.

A determination is made if the version numbers match the version numbers of OS, applications and NOS that have been tested with the process software, 224. If all of the versions match and there is no missing required software the integration continues in 227.

If one or more of the version numbers do not match, then the unmatched versions are updated on the server or servers with the correct versions, 225. Additionally if there is missing required software, then it is updated on the server or servers, 225. The server integration is completed by installing the process software, 226.

Determining if there are any programs of the process software that will execute on the clients, 227, which follows 221, 224 or 226. If no process software programs execute on the clients the integration proceeds to 230 and exits. If this not the case, then the client addresses are identified, 228.

The clients are checked to see if they contain software that includes the operating system (OS), applications, and network operating systems (NOS), together with their version numbers that have been tested with the process software, 229. The clients are also checked to determine if there is any missing software that is required by the process software, 229.

A determination is made is the version numbers match the version numbers of OS, applications and NOS that have been tested with the process software, 231. If all of the versions match and there is no missing required software, then the integration proceeds to 230 and exits.

If one or more of the version numbers do not match, then the unmatched versions are updated on the clients with the correct versions, 232. In addition, if there is missing required software then it is updated on the clients, 232. The client integration is completed by installing the process software on the clients, 233. The integration proceeds to 230 and exits.

The process software for tuning DLP rules is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 11:
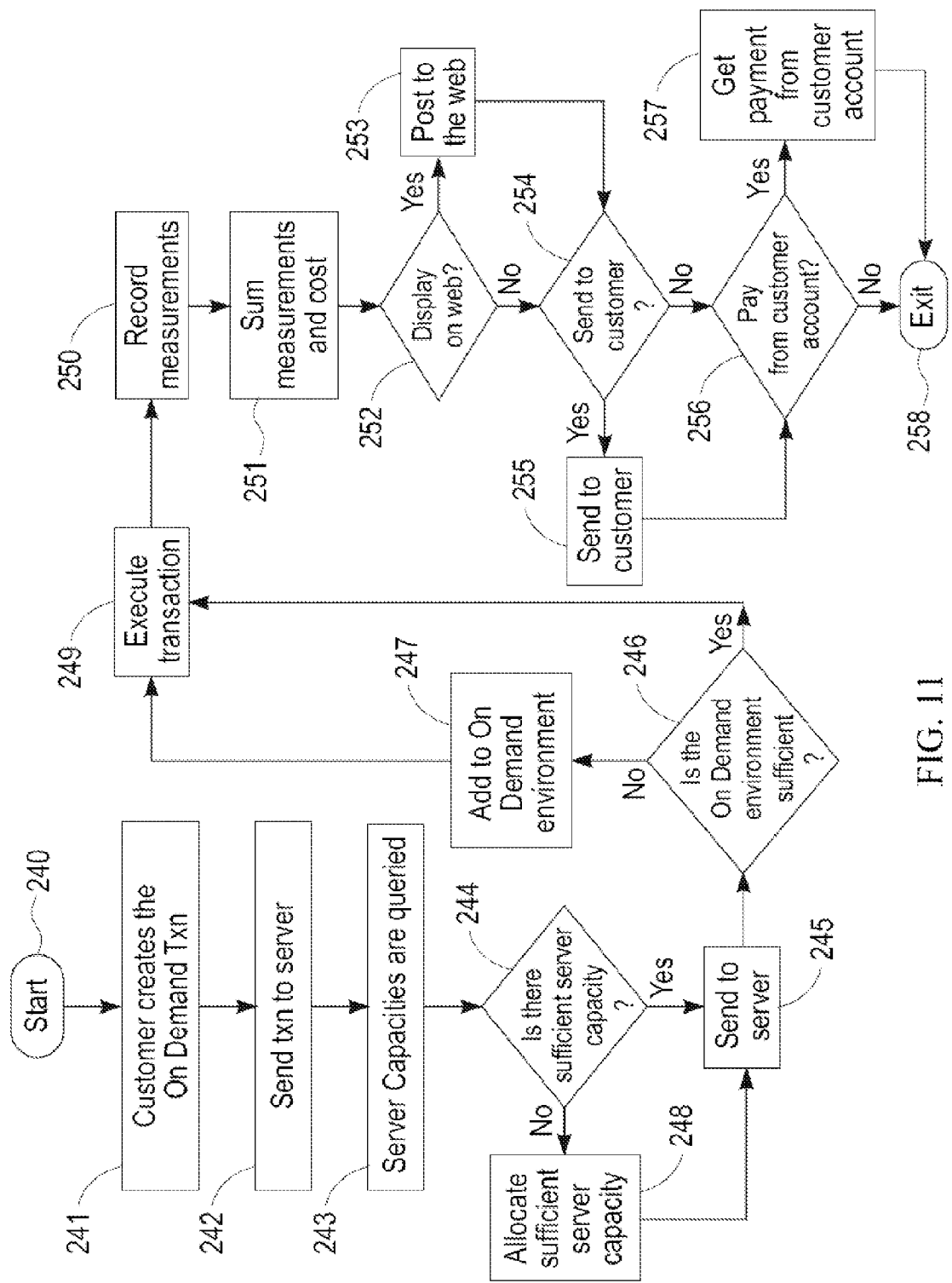
FIG. 11 illustrates an example method for On Demand availability of at least one embodiment according to the invention.

FIG. 11 illustrates a method for the On Demand process, 240. A transaction is created than contains the unique customer identification, the requested service type and any service parameters that further specify the type of service, 241. The transaction is then sent to the main server, 242. In an On Demand environment the main server can initially be the only server, and then as capacity is consumed other servers are added to the On Demand environment.

The server central processing unit (CPU) capacities in the On Demand environment are queried, 243. The CPU requirement of the transaction is estimated, then the server's available CPU capacity in the On Demand environment is compared to the transaction CPU requirement to see if there is sufficient CPU available capacity in any server to process the transaction, 244. If there is not sufficient server CPU available capacity, then additional server CPU capacity is allocated to process the transaction, 248. If there was already sufficient Available CPU capacity then the transaction is sent to a selected server, 245.

Before executing the transaction, a check is made of the remaining On Demand environment to determine if the environment has sufficient available capacity for processing the transaction. This environment capacity consists of such things as but not limited to network bandwidth, processor memory, storage etc., 246. If there is not sufficient available capacity, then capacity will be added to the On Demand environment, 247. Next the required software to process the transaction is accessed, loaded into memory, and then the transaction is executed, 249.

The usage measurements are recorded, 250. The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer, 251.

If the customer has requested that the On Demand costs be posted to a web site, 252, then they are posted, 253. If the customer has requested that the On Demand costs be sent via e-mail to a customer address, 254, then they are sent, 255. If the customer has requested that the On Demand costs be paid directly from a customer account, 256, then payment is received directly from the customer account, 257. The last step is exit the On Demand process.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method comprising:
processing a flow of packets with a data loss prevention sensor using a signature set;
diverting any packet that matches at least one signature to an alert database;
receiving an alert validity attribute into the alert database;
quantifying for each signature contained in the signature set an effect on the change in the number of alerts from its removal;
determining with an analytics module whether any signature has a ratio of valid to false positive alerts less than a first threshold; and
when at least one signature has the ratio less than the threshold
identifying and removing with an adjustment module at least one signature having a ratio less than the first threshold where the signature is removed from the signature set, and repeating quantifying and determining;
the method further comprising:
annotating at least one signature in the signature set with a signature weighting;
including in the metadata for any alert the signature's signature weighting; and
removing from quantifying any signature having its signature weighting above a value threshold.

2. The method according to claim 1, wherein when no signature has the ratio less than the first threshold, repeating the method.

3. The method according to claim 1, further comprising receiving into the analytics module the first threshold.

4. The method according to claim 1, further comprising receiving in the alerts database historical alerts including an identification of the signature that caused the alert, a copy of the packet associated with the alert, and an alert metadata.

5. The method according to claim 1, wherein quantifying includes for each signature having the ratio less than a second threshold:
removing from the signature set that signature,
applying the modified signature set against the packets present in the alerts database, and
determining at least one attribute for the signature.

6. The method according to claim 5, wherein the at least one attribute includes at least one of a total number of alerts not selected by not applying the removed rule, a number of associated valid alerts, and a number of associated false positive alerts.

7. The method according to claim 5, wherein identifying and removing includes ordering the signatures by at least one attribute from smallest to largest with the analytics module,
   displaying through the adjustment module at least one signature and its associated at least one attribute to a user, and
   removing with the adjustment module at least one signature from the signature set in response to a removal instruction from the user.

8. The method according to claim 5, wherein identifying and removing includes ordering the signatures based on at least one attribute from smallest to largest with the analytics module, and
   removing with the adjustment module the first signature in the ordered signatures from the signature set.

9. The method according to claim 1, further comprising:
   annotating at least one signature in the signature set with a signature weighting;
   including in the metadata for any alert the signature's signature weighting; and
   for each signature after it has been quantified, modifying its ratio by its signature weighting.

10. The method according to claim 1, wherein receiving the alert validity attribute into the alert database includes generating with a positive analyzer an alert validity attribute for each alert in the alert database.

11. The method according to claim 1, wherein receiving the alert validity attribute into the alert database includes displaying with a positive analyzer each alert to a user for review and categorization of the alert as valid or false positive,
   receiving with the positive analyzer each categorization, and
   updating the alert validity attribute for the respective alert in the alert database that the positive analyzer received the categorization for.

12. A method comprising:
   gaining access to an alert database and a signature set by an analytics module and an adjustment module, where the alert database includes whether each alert is a valid alert or a false positive alert;
   quantifying for each signature contained in the signature set an effect on the change in the number of alerts from its removal;
   determining with an analytics module whether any signature has a ratio of valid to false positive alerts less than a first threshold; and
   when at least one signature has the ratio less than the first threshold
      identifying and removing with an adjustment module at least one signature from the signature database having a ratio less than the first threshold where the signature is removed from the signature set, and
   repeating quantifying and determining;
   the method further comprising:
      annotating at least one signature in the signature set with a signature weighting;
      including in the metadata for any alert the signature's signature weighting; and
      removing from quantifying any signature having its signature weighting above a value threshold.

13. The method according to claim 12, further comprising receiving into the analytics module the first threshold.

14. The method according to claim 12, wherein quantifying includes for each signature having the ratio less than a second threshold:
   removing from the signature set that signature,
   applying the modified signature set against the packets present in the alerts database, and
   determining at least one attribute for the signature.

15. The method according to claim 14, wherein the at least one attribute includes at least one of a total number of alerts not selected by not applying the removed signature, a number of associated valid alerts, and a number of associated false positive alerts; and
   the first threshold equals the second threshold.

16. The method according to claim 14, wherein identifying and removing includes ordering the signatures based on at least one attribute from smallest to largest with the analytics module, and
   removing with the adjustment module the first signature in the ordered signatures from the signature set.

17. A method comprising:
   creating an alert database having a plurality of alerts each alert resulting from a determination by a data loss prevention sensor that a packet matches at least one signature in a signature set and each alert having an associated alert validity attribute;
   quantifying for each signature contained in the signature set an effect on the change in the number of alerts from its removal by
      removing from the signature set that signature,
      applying the modified signature set against the packets present in the alerts database, and
      determining at least one attribute for the signature;
   determining with an analytics module whether any signature has a ratio of valid to false positive alerts less than a threshold;
   when at least one signature has the ratio less than the threshold
      identifying and removing with an adjustment module at least one signature having a ratio less than the threshold where the signature is removed from the signature set, and repeating quantifying and determining; and
   when no signature has the ratio less than the threshold, repeat the method;
   the method further comprising:
      annotating at least one signature in the signature set with a signature weighting;
      including in the metadata for any alert the signature's signature weighting; and
      removing from quantifying any signature having its signature weighting above a value threshold.

18. The method according to claim 17, wherein the at least one attribute includes at least two of a total number of alerts not selected by not applying the removed rule, a number of associated unique valid alerts, and a number of associated unique false positive alerts.

19. The method according to claim 18, wherein identifying and removing includes ordering the signatures by at least one attribute from smallest to largest with the analytics module,
   displaying through the adjustment module at least one signature and its associated at least two attributes to a user, and
   removing with the adjustment module at least one signature from the signature set in response to a removal instruction from the user.

20. The method according to claim 18, wherein identifying and removing includes ordering the signatures based on at least one attribute from smallest to largest with the analytics module, and
    removing with the adjustment module the first signature in the ordered signatures from the signature set.

21. A method comprising:
    creating an alert database having a plurality of alerts each alert resulting from a determination by a data loss prevention sensor that a packet matches at least one signature in a signature set and each alert having an associated alert validity attribute;
    quantifying for each signature contained in the signature set an effect on the change in the number of alerts from its removal by
        removing from the signature set that signature,
        applying the modified signature set against the packets present in the alerts database, and
        determining at least one attribute for the signature, where the at least one attribute includes a total number of unique alerts representing alerts not selected by not applying the removed rule, a number of associated unique valid alerts, and a number of associated unique false positive alerts;
    determining with an analytics module whether any signature has a ratio of unique valid to unique false positive alerts less than a unique threshold;
    when at least one signature has the unique ratio less than the unique threshold
        identifying and removing with an adjustment module at least the first signature in an ordered list of signatures based on the unique ratios of the signatures, where the first signature is removed from the signature set, and
        repeating quantifying and determining; and
    when no signature has the ratio less than the threshold, repeat the method;
    the method further comprising:
        annotating at least one signature in the signature set with a signature weighting;
        including in the metadata for any alert the signature's signature weighting; and
        at least one of removing from quantifying any signature having its signature weighting above a value threshold or for each signature after it has been quantified, modifying its ratio by its signature weighting.

* * * * *